United States Patent [19]
Paschal

[11] Patent Number: 5,458,286
[45] Date of Patent: Oct. 17, 1995

[54] ROTATABLE MAILBOX MOUNTING ASSEMBLY

[76] Inventor: John G. Paschal, 35 Thomastown Rd., Mine Hill, N.J. 07801

[21] Appl. No.: 209,100

[22] Filed: Mar. 11, 1994

[51] Int. Cl.⁶ .................................................. B65D 91/00
[52] U.S. Cl. .............................. 232/39; 248/131
[58] Field of Search ................................ 248/131; 232/39

[56] References Cited

U.S. PATENT DOCUMENTS

| | | | |
|---|---|---|---|
| 2,175,134 | 10/1939 | Smith | 248/131 |
| 2,687,267 | 8/1954 | Copenhaver | 248/131 |
| 3,407,997 | 10/1968 | Wood et al. | 232/39 |
| 4,508,259 | 4/1985 | Hicks | 232/39 |
| 4,659,050 | 4/1987 | Tabayashi | 248/131 |
| 4,667,918 | 5/1987 | Page | 232/39 |
| 4,697,778 | 10/1987 | Harashima | 248/131 |

Primary Examiner—Michael J. Milano

[57] ABSTRACT

A rotatable mailbox mounting assembly which when permanently mounted on an existing round or square support post or extended arm, with a mailbox mounted thereupon, will allow the mailbox to be rotated 360 degrees in either direction. The mailbox is held in a firm mail receiving position by a ball detent mechanism. The mechanism consists of one spring and two balls opposite one another The spring forces the balls into two detent grooves, thus holding the mailbox firmly in a mail receiving position. When a predetermined force is exerted on the front or rear of the mailbox, the spring-loaded balls are forced out of their "home" or detent position, thus allowing the mailbox to be rotated so that the mail can be retrieved from the rear, thereby avoiding the need to walk onto a roadway to retrieve mail. The unit is compact, fitting neatly into the recess in the bottom of all commercially manufactured mailboxes. The materials used and design make it durable and low-maintenance.

5 Claims, 5 Drawing Sheets

ROTATABLE MAILBOX MOUNTING ASSEMBLY

BACKGROUND OF THE INVENTION

Statistically, ten percent of all pedestrian fatalities occur while a person is retrieving their mail from a rural roadside mounted mailbox!

Accordingly, various devices allowing mailboxes to be rotated so as to allow mail to be retrieved from the rear, thus avoiding the need for a person to walk and stand in harms way to retrieve his mail, have been invented and patents issued thereto. Ironically, to my knowledge there are no rotatable mailbox devices available to the public even though there are several patents issued on such devices. All of the present designs are either too awkward or impractical.

The design I propose is the "state of the art" that neither copies nor impinges on any prior art or present patents.

The materials used in its design will last a lifetime. The ease with which the mailbox rotates is far superior to any prior art. This device can be easily attached between any existing mailbox and square, round, or flat support post.

SUMMARY OF THE INVENTION

The design I propose is such that almost anyone with a minimal amount of mechanical knowledge can easily attach my rotatable mailbox mounting assembly between any existing mailbox and its support post whether it be square, round, flat or extended arm. It was my intention to design this device to last a lifetime, no maintenance is required. The components are virtually indestructable. Unlike prior patents, the close design tolerances of the moving parts prevents road dust, dirt and other foreign matter from entering the moving parts, thus preventing wear, jamming and sticking especially in the winter from freezing rain and ice build up. Unlike some prior designs, my invention allows the mailbox to be rotated in either direction a full 360 degrees. This is a very important feature in that a person can retrieve his mail from either side or from the rear.

Another important factor to be considered is the fact that the total height of my device is little more than one inch.

The complete assembly is protected from the elements by the one inch recess built in to the bottom of all commercially manufactured mailboxes, which also shields the device from view if one is concerned about esthetics.

Figure 1:
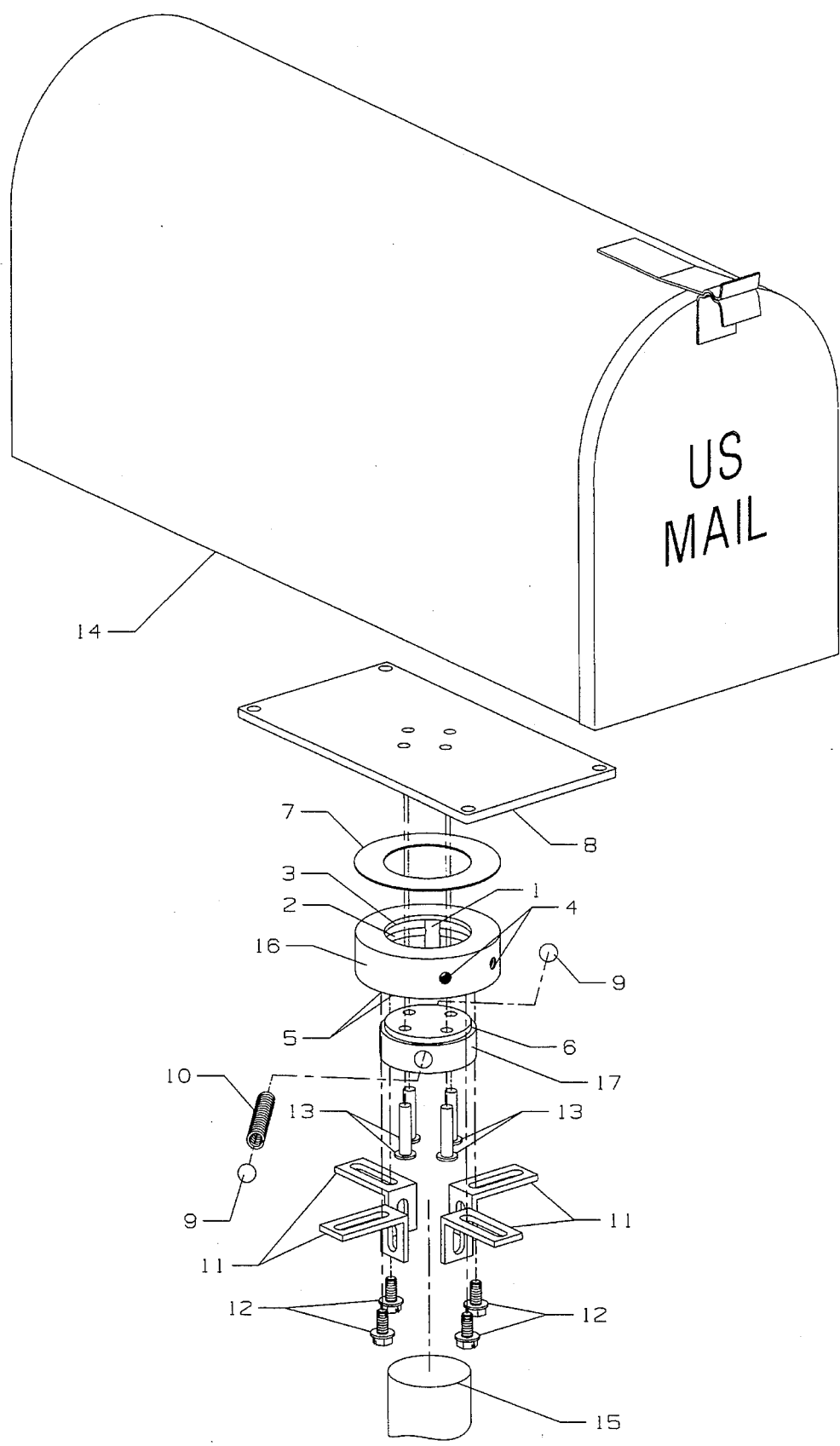
FIG. 1 is an exploded view of the preferred embodiment in a mail receiving position. Also the mounting brackets are positioned to be mounted to a small round support post, or a small square post; generally from one and a half inch to three inches in diameter.
Figure 2:
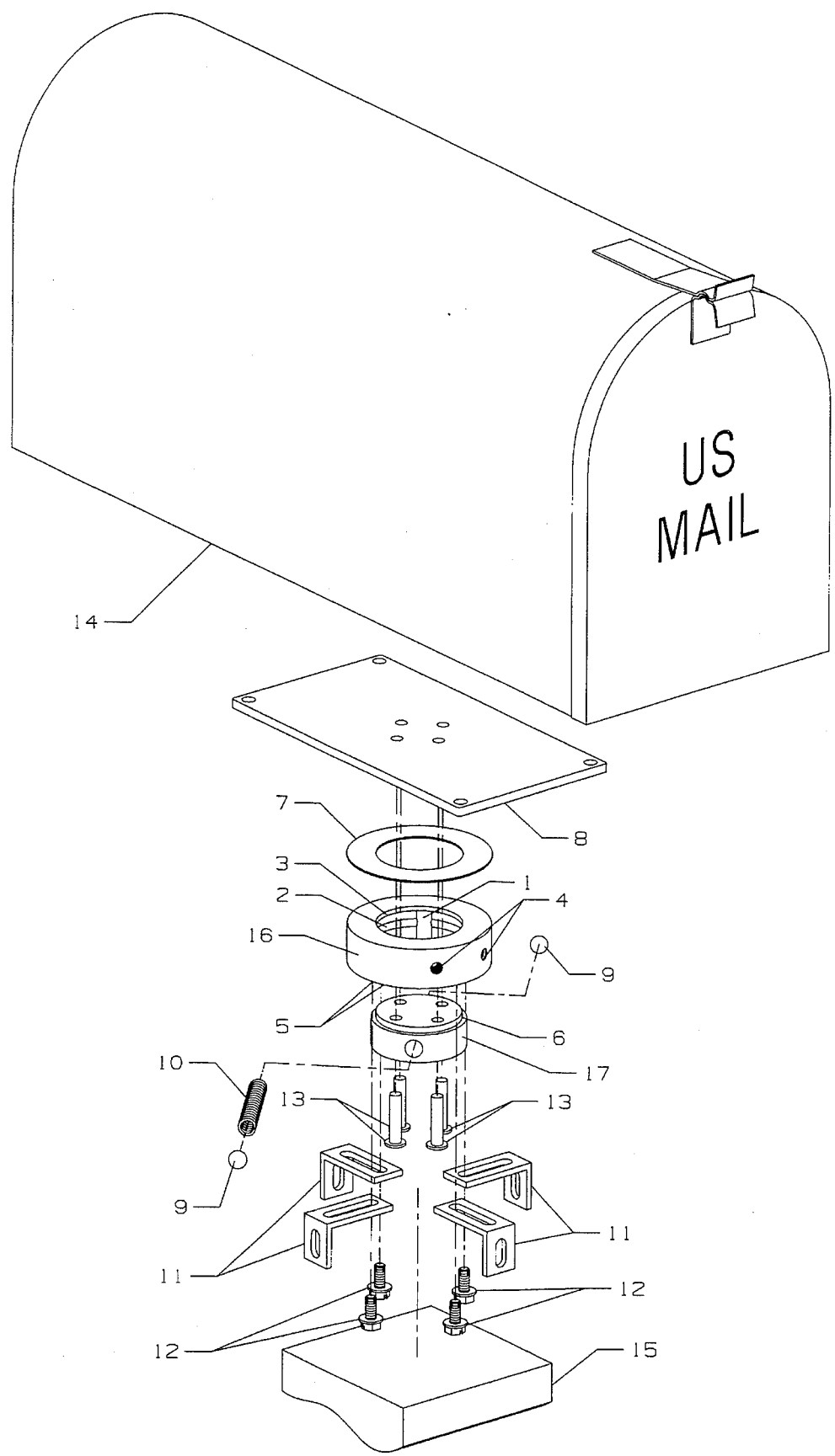
FIG. 2 is the same as FIG. 1 except the mounting brackets are turned 180 degrees to allow for mounting of said device to a larger round support post or a larger square support post; generally from three inches to four and a half inches in diameter.

In both FIG. 1 and FIG. 2, the mounting brackets will attach to a round or square support post from one and a half inch to four and a half inch in diameter.

Figure 3:
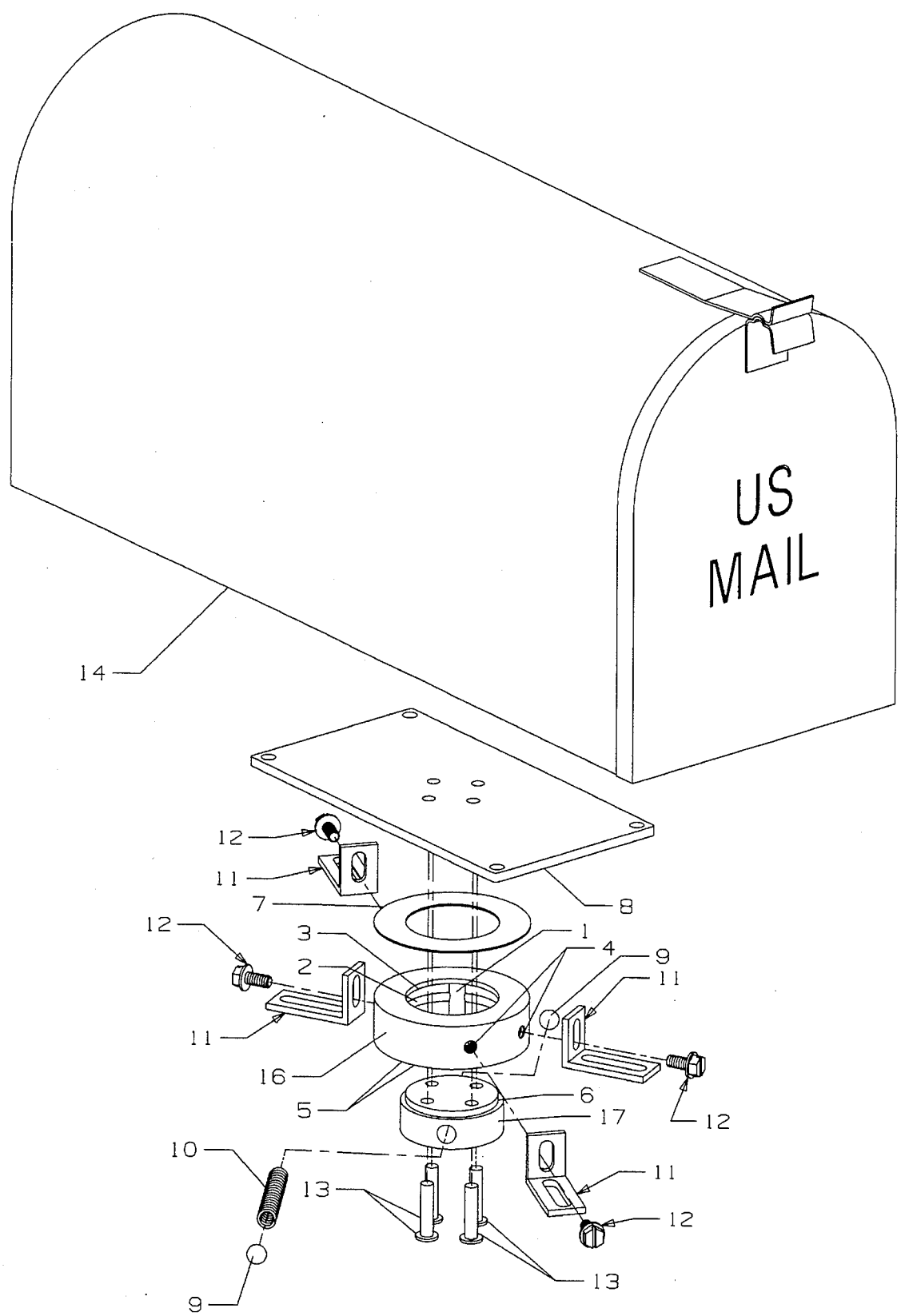

FIG. 3 is basically the same as FIGS. 1 and 2. It shows how the mounting brackets can be positioned to allow said device to be mounted upon any flat surface or on an extended arm.

Figure 4:
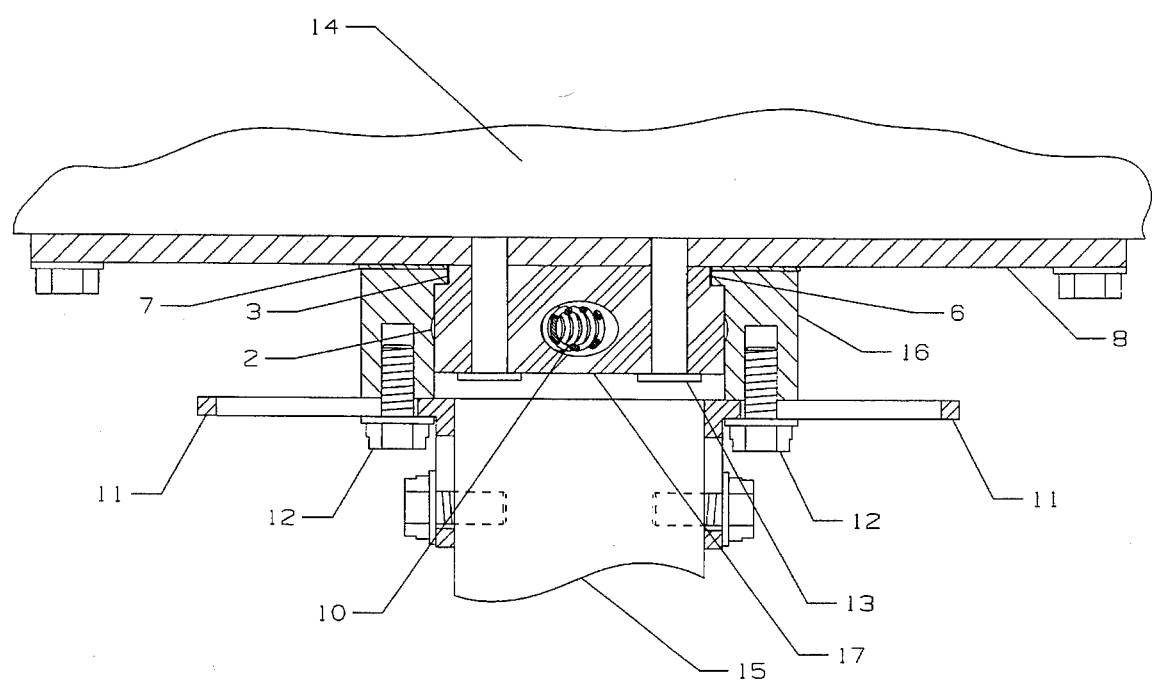

FIG. 4 is a cross sectional view of the preferred embodiment showing the groove the two detent balls ride when rotating mailbox. This groove is necessary for facilitating the ease in turning mailbox.

Figure 5:
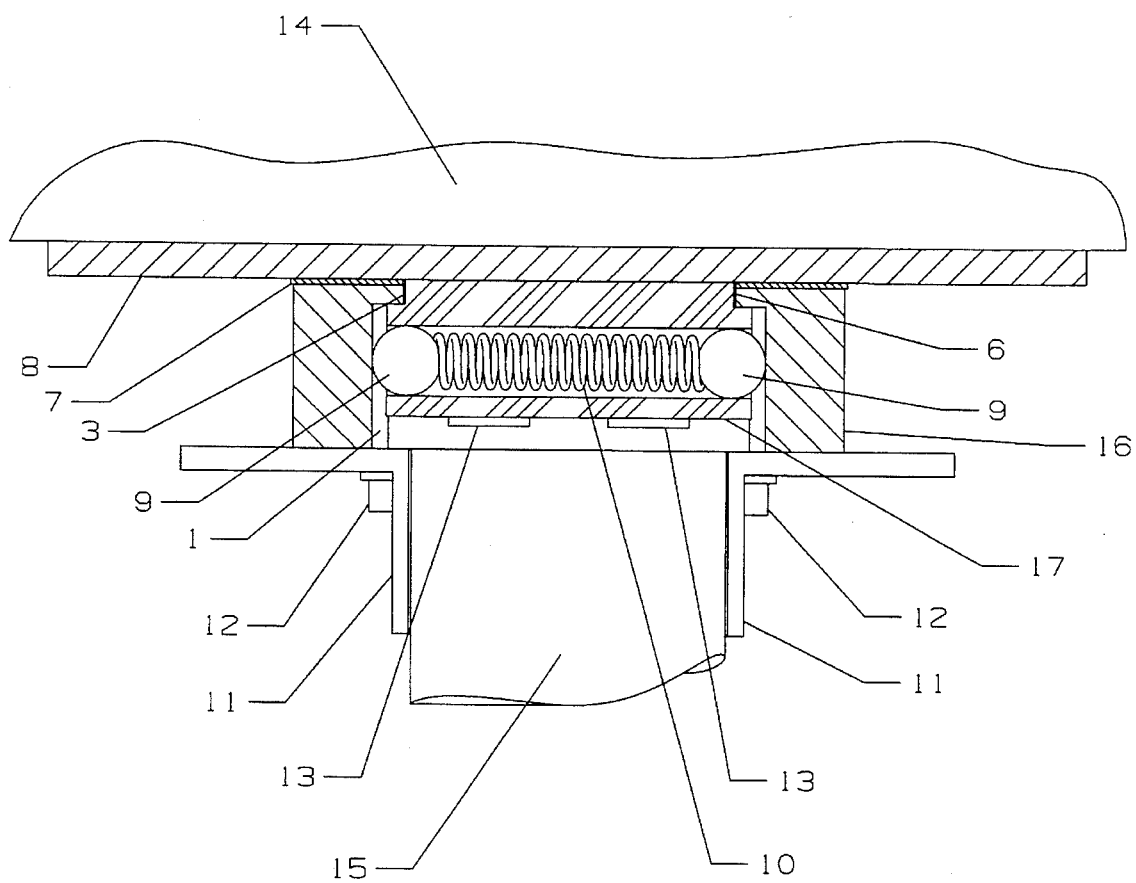

FIG. 5 is a cross sectional view of the preferred embodiment showing the two detents the balls engage to hold the mailbox in its mail receiving position.

DESCRIPTION OF PREFERRED EMBODIMENT

FIG. 1 shows a mailbox 14 and the embodiment of my invention. (hereinafter referred to as device) The aluminum mounting plate 8 attaches to mailbox 14 by means of bolts or screws.

Delrin bearing 17 is permanently secured to aluminum mounting plate 8 by means of four zinc plated rivets 13. Aluminum collar 16 of the first embodiment is the portion of device which is attached to a mounting post by means of four aluminum brackets 11.

Spring 10 goes through hole of Debrin bearing 17 which said spring 17 forces two balls 9 into detents 1 of aluminum collar 16. Said detents are opposite one another on said aluminum collar. When said balls are positioned in the two detents, the mailbox is in a fixed or firm mail receiving position. Mylar spacer 7 is placed between rotating surface of aluminum mounting plate 8 and aluminum collar 16.

Flanged lip 3 of aluminum collar 16 rides in notch 6 of Delrin bearing 17. Said lip is designed to prevent the assembly from separating once the device is riveted together by four rivets 13. Groove 2 in aluminum collar 16 is designed to allow for two balls 9 to ride when mailbox is being rotated. The groove facilitates the ease with which the mailbox rotates. Four adjustable mounting brackets 11 are positioned so as to allow for mounting device on any round or square support post from one and a half inch to three inches in diameter.

Said adjustable mounting brackets 11 are secured to aluminum collar 16 by means of four washer head bolts 12. Said mounting brackets 11 are designed with an elongated mounting hole which allows for the variation in support post sizes. FIG. 2 is the same as FIG. 1 except that it illustrates how adjustable mounting brackets 11 can be turned one half turn thereby allowing device to be mounted on any round or square support post from 3 inches to four and a half inches in diameter. Said mounting brackets 11 are designed with an elongated mounting hole which allows for the variation in support post sizes. FIG. 3 is the same as FIGS. 1 and 2 except that it illustrates how adjustable mounting brackets 11 can be secured to aluminum collar 16 by means of four screws 12 into four holes 4 drilled into outer circumferences of aluminum collar 16 thereby allowing for the mounting of device on a flat surface such as an extended horizontal mounting arm or the like.

FIG. 4 is a cross sectional view of the preferred embodiment showing device as assembled. Mailbox 14 mounted upon aluminum plate 8. Mylar spacer 7 between aluminum collar 16 and aluminum mounting plate 8. Flange lip 3 of aluminum collar 16 which rides in notch 6 of Delrin bearing 17 prevents unit from separating after device is riveted together by four rivets 13.

Groove 2 as detailed in FIG. 1 allows the two balls 9 to ride smoothly with reduced friction when mailbox is being rotated thus reducing force needed to rotate mailbox. Four adjustable mounting brackets 11 secured to aluminum collar 16 by means of four washer head bolts 12. Four zinc plated rivets 13 permanently secure Delrin bearing 17 to aluminum mounting plate 8.

Spring 10 forces the two balls 9 into detents opposite one another thereby securing mailbox in "home" or mail receiving position.

FIG. 5 is essentially the same as FIG. 4 shown here are two balls 9 positioned into two detents 1 opposite one another, holding mailbox 14 in "home" or mail receiving position.

I claim:

1. A rotatable mounting platform approximately one and one quarter inches in height which when secured to a base of a mailbox allows the mailbox to be rotated in either direction a full 360 degrees, the rotatable mounting platform comprising, a top aluminum plate four inches wide, seven inches long and three sixteenth inch thick, a cylindrical Delrin bearing three quarters inch thick and two inches in diameter secured to the center of the top plate, the bearing having a three eighths inch hole through its center, an aluminum collar encircling the Delrin bearing which is affixed to the support post by adjustable brackets, the collar including two opposing detents, and a spring located within the hole in the bearing and biasing two spherical bearings toward the aluminum collar, wherein the spherical bearings are forced into the two opposing detents in the aluminum collar by the spring thereby securing the mailbox in a mail receiving position.

2. A rotatable mounting platform which when secured to a base of a mailbox and to a top of an existing support post will allow the mailbox to be rotated in either direction a full 360 degrees, the rotatable mounting platform comprising, a top plate, a cylindrical bearing secured to the center of the top plate, the bearing having a hole extending transversely through it, a collar encircling the bearing, the collar affixed to the support post by adjustable brackets, and the collar having two opposing detents therein, and a spring located in the hole and biasing two spherical bearings toward the collar, wherein the spherical bearings are forced into the two opposing detents in the collar by the spring, thereby securing the mailbox in a mail receiving position.

3. The rotatable mounting platform of claim 2 wherein the collar has a groove defined on its inner surface in which the spherical bearings travel during rotation of the platform.

4. The rotatable mounting platform of claim 2 wherein the cylindrical bearing is made of Delrin.

5. The rotatable mounting platform of claim 2 wherein the plate and collar are made of aluminum.

\* \* \* \* \*